US011818317B2

(12) United States Patent
Morovic et al.

(10) Patent No.: US 11,818,317 B2
(45) Date of Patent: Nov. 14, 2023

(54) PRINTING MANAGEMENT

(71) Applicant: Hewlett-Packard Development Company, L.P., Spring, TX (US)

(72) Inventors: Peter Morovic, Sant Cugat del Valles (ES); Jan Morovic, London (GB); Xavier Farina Vargas, Sant Cugat del Valles (ES); Jordi Arnabat Benedicto, Sant Cugat del Valles (ES); Alessandro Beltrami, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/418,982

(22) PCT Filed: Jun. 13, 2019

(86) PCT No.: PCT/US2019/037071
§ 371 (c)(1),
(2) Date: Jun. 28, 2021

(87) PCT Pub. No.: WO2020/251579
PCT Pub. Date: Dec. 17, 2020

(65) Prior Publication Data
US 2022/0094809 A1 Mar. 24, 2022

(51) Int. Cl.
*H04N 1/32* (2006.01)
*G06F 3/12* (2006.01)

(52) U.S. Cl.
CPC ....... *H04N 1/32149* (2013.01); *G06F 3/1204* (2013.01); *G06F 3/1208* (2013.01); *G06F 3/1285* (2013.01)

(58) Field of Classification Search
CPC combination set(s) only.
See application file for complete search history.

(56) References Cited

U.S. PATENT DOCUMENTS

| 7,239,422 | B2 | 7/2007 | Braun et al. | |
|---|---|---|---|---|
| 7,931,199 | B2* | 4/2011 | Elgar | G06Q 40/02 358/1.6 |
| 11,062,184 | B1* | 7/2021 | Parsons | G06K 15/007 |
| 11,126,125 | B1* | 9/2021 | Lin | G03G 15/55 |
| 2003/0095811 | A1 | 5/2003 | Haines | |
| 2006/0126113 | A1 | 6/2006 | Narazaki | |
| 2009/0296995 | A1* | 12/2009 | Shibuya | G06F 21/6218 726/2 |
| 2010/0031014 | A1 | 2/2010 | Senda | |
| 2011/0128566 | A1 | 6/2011 | Eum et al. | |
| 2012/0274775 | A1 | 11/2012 | Reiffel | |
| 2014/0168259 | A1 | 6/2014 | Yamaguchi | |

(Continued)

FOREIGN PATENT DOCUMENTS

| JP | 2005165565 A | 6/2005 |
|---|---|---|
| WO | 2017/012657 A1 | 1/2017 |

*Primary Examiner* — Helen Zong

(57) ABSTRACT

Certain examples relate to a method of printing management. An image is received for printing and printing parameters to print the image are determined. The image is printed onto a substrate using the printing parameters, and the image is printed with an embedded code corresponding to the printing parameters. The printing parameters are associated with the embedded code such that the printing parameters are retrievable from the embedded code.

14 Claims, 5 Drawing Sheets

(56) References Cited

U.S. PATENT DOCUMENTS

| | | |
|---|---|---|
| 2014/0240735 A1 | 8/2014 | Salgado |
| 2015/0288846 A1* | 10/2015 | Yang ........................ H04N 1/21 |
| | | 358/403 |
| 2016/0253127 A1* | 9/2016 | Panda .............. G06K 19/06112 |
| | | 358/1.15 |
| 2016/0261839 A1 | 9/2016 | Holub |
| 2016/0358053 A1 | 12/2016 | Tsuruyama |
| 2017/0228200 A1* | 8/2017 | Kessels .............. H04N 1/00411 |
| 2017/0295372 A1 | 10/2017 | Lawrence |
| 2018/0081307 A1* | 3/2018 | Sato ........................ G06K 15/16 |
| 2020/0004469 A1* | 1/2020 | Tomida ................. G06F 3/1287 |
| 2020/0004479 A1* | 1/2020 | Aoki ...................... G06F 3/1268 |
| 2020/0081675 A1* | 3/2020 | Watanabe .............. G06F 3/1275 |
| 2021/0195040 A1* | 6/2021 | Nazzaro .............. H04N 1/00482 |
| 2022/0094809 A1* | 3/2022 | Morovic ............... G06F 3/1208 |

* cited by examiner

PRINTING MANAGEMENT

BACKGROUND

Printing devices may be used to render a color image onto a medium such as paper, paper-like, rigids or textile. The color image may be received as digital image data, where the image data indicates color values in a color space for pixels of the image. For example, a Red, Green, Blue (RGB) image may have a first number of pixels in an x-direction and a second number of pixels in a y-direction, where each pixel has a value in a Red, Green Blue (RGB) color space. In these cases, each pixel may be represented as a triple or tristimulus value, e.g. if each value is represented using 8-bits, three variables in the range 0-255 such as (125, 76, 12). To render the color image, the image rendering device needs to represent the digital image data in a color space that is appropriate for its available color resources. For example, a printer may include printing fluids of Cyan, Magenta, Yellow and Black and so represent colors within a CMYB color space. The image data needs to be mapped into a color space appropriate for the printer. The color mapped image data also need to be further processed in order to generate print instructions for the printing components of the printer such as ink nozzles, lasers, and motors. Such processing may include color separation, halftoning and edge control, which all affect the final rendering.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
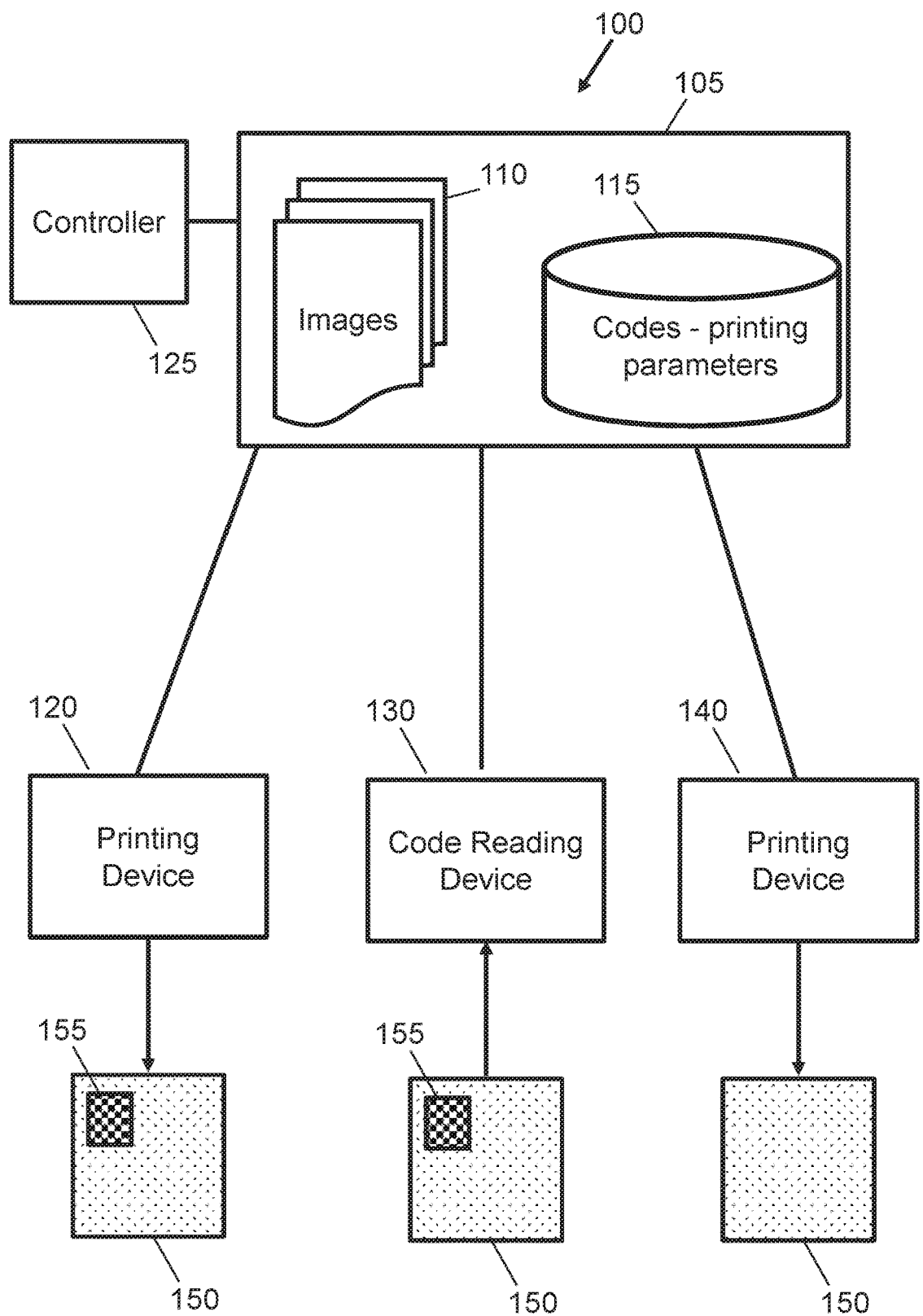
FIG. 1 is a schematic diagram of a printing management system according to an example.

Certain examples described herein address a challenge of printing management. In an example, rendering an image on a print rendering device such that it substantially repeats, replicates or at least sufficiently approximates the same image rendered by a different print rendering device or the same print rendering device at a different time may be achieved by linking the originally printed image with the printing parameters used to print the image. By printing the image again using the same printing parameters, the rendered image repeats or substantially replicates the original printed image. In an example, the printing parameters are linked with the originally printed image using a code embedded within the printed image. The embedded code may represent the printing parameters themselves or may refer to an appropriate entry in a database. The embedded code may be read in order to retrieve the printing parameters used in the original printed image so that this can be repeated at a later time and/or on a different print rendering device.

In another example, the printing parameters used to print the image are embedded in an embedded code within the printed image in order to allow analysis of the print rendering, for example to allow calibration of the print rendering device used. The printing parameters may include not just those used by the print rendering device (e.g. parameters used for color mapping, color separation, halftoning, etc.) but also those used to transform the image in earlier processing (e.g. parameters used in image data generation, color mapping, color correction, white balance, etc.). All of the parameters used in the workflow, from generating the image to printing, can affect the rendered image and are therefore useful in analyzing the colors finally rendered In one use case, a first type of printer may be used to render posters, boards or other printed material in advance for use at a distant exhibition. If a replacement is desired whilst at the exhibition, the same type of printer may be available at the location of the exhibition, but without the printing parameters used to print the original image, it may not be possible accurately repeat the printing of the original image. Hence, without extensive, accurate and expensive to maintain tracking information it is difficult to replicate the image exactly. Even when tracking information is available it may easily become disassociated from the printed image.

In an example, tracking and print setting information may be easily retrieved using the embedded code, so that a print service provider sent the information may be able to repeat the printing of the original image. In another example, it may be desired to calibrate a printer by printing multiple color images and measuring the colors rendered. In order to properly calibrate the printer, it is important to keep track of the printing parameters used and this can be achieved by associating them with the embedded code.

Rendered color outputs produced in color-rendering devices depend on the color resources of the devices. Examples of color resources include available substrates (e.g. type of paper or textile), available colorants such as sets of colored inks and/or dyes, available priming and/or finishing agents (e.g. varnishes and the like), printhead capabilities (e.g. output resolution or number of drops per nozzle), and printing speed. Color resources may also include elements of a color processing pipeline that are available to process digital image data representing a color image, for example color mapping components or tables for mapping image pixel color values from an input color space (e.g. RGB) to a color space appropriate for the color-rendering device (e.g. CYMK).

A color gamut represents a range of renderable colors for a color-rendering device and may be defined as a volume in a multi-dimensional color space. The multi-dimensional color space may be device-dependent, e.g. have dimensions that are set by the physical properties and/or characteristics of a particular rendering device, or may be device-independent, e.g. be independent of any one rendering device. Red, Green, Blue (RGB) color spaces are typically device-dependent and have three dimensions or channels, each representing an intensity of one of the three colors; similarly, a Cyan, Magenta, Yellow and Black (CMYK) color space is a device-dependent color space that is dependent on a number of colorants used in a printing system (e.g. typically four dimensions). Examples of device-independent color spaces include those defined by the Commission Internationale de l'Eclairage (CIE) such as CIE-XYZ and CIE-L*a*b* color spaces.

Color properties may also be described in other ways for some color-rendering devices. For example, a Neugebauer Primary area coverage (NPac) space may be deemed a print control space that controls a color output of an imaging device. It may also be considered, in certain cases, to correspond to a color space. An NPac vector in the NPac space represents a statistical distribution of one or more Neugebauer Primary (NP) vectors over an area of a halftone. In a simple binary (bi-level, i.e. two drop state: "drop" or "no drop") printer, an NP is one of 2 k combinations of k inks within the printing system. For example, if a printing device uses CMY inks there can be eight NPs. These NPs relate to the following: C, M, Y, C+M, C+Y, M+Y, C+M+Y, and W ("white" or "blank" indicating an absence of ink). As may be seen, an NP may comprise an overprint of two available inks, such as a drop of cyan on a drop of magenta (for a bi-level printer) in a common addressable print area (e.g. a printable "pixel"). Other examples may also incorporate multi-level printers, e.g. where print heads are able to deposit N drop levels, for example via multiple print passes or print-bars; in this case an NP may include one of Nk combinations of k inks within the printing system. An NPac space provides a large number of metamers. Metamerism is the existence of a multitude of combinations of reflectance and emission properties that result in the same perceived color for a fixed illuminant and observer.

There are many color processing steps that may be carried out between generation or retrieval of an image for printing until the final rendering or printing of the image, and these processes can be thought of as a color processing pipeline or workflow. The workflow may depend on how the image was generated (e.g. captured by a camera or by user instructions within a software application), and the type of image (e.g. simple automatically generated patch with multiple squares of different colors or a complex image containing text, color vector and raster image data).

Certain examples described herein provide a printing management system or method in which an image is printed with an embedded code linked to the printing parameters used to print the image. This may be used to retrieve the printing parameters in order to repeat the printing of the image so that it largely replicates the original printed image. This may also be used to track printing parameters used to print an image so that the image can be more accurately analyzed, for example for printer calibration.

Examples of printing parameters include: substrate selection; colorant selection; printing speed; halftoning selection; color separation parameters; color mapping resources including color (e.g. International Color Consortium—ICC) device links for the reference and target color-rendering devices, a color (e.g. ICC) output profile for the target color-rendering device, mapping tables that map pixels in the image data from the color space of the reference color-rendering device to corresponding pixels in the modified image data in the color space of the target color-rendering device; image transformations include compression and decompression, file type conversion, tone mapping, noise correction. Printing parameters may also include metadata relating to the image including image identifier; customer identifier; job identifier; date and time.

The embedded code may include a QR code; bar code; stegatone; invisible watermark; and/or footnote in the margin. The embedded code may represent the printing parameters directly or may logical associate these, for example with an identifier in a database.

FIG. 1 shows a printing management matching system 100 according to an example. The printing management system 100 comprises a controller 125, storage medium 105 having one or more images 110 and a database 115, a first printing device 120, a code reading device 130 and a second printing device 140. The system 100 may be operated by a single entity with the components of the system located close to each other, or it may be distributed over large geographical distances, for example within different offices of a multinational company. The components of the system 100 may also be operated by different parties.

The printing devices 120, 140 may be printers designed to use a set of inks to render an image onto a substrate or print medium using the set of inks. The printing devices 120, 140 may render the image onto the substrate by depositing inks from the set of inks onto the substrate. Throughout this description it is acknowledged that the terms "printer" and "printing" may also apply to three-dimensional printing systems, for example where colored agents are deposited onto a bed of print material such as a bed of powdered polymer particles. The inks used to render the image may be deposited in a controlled manner. The set of inks may comprise more than one color ink. An example of a set of inks used in an inkjet printer may include the colors Black, Cyan, Yellow, and Magenta. Different color-rendering devices may use different ink colors to produce the gamut available to the device 120, 140. The gamut may be altered by altering the configuration of the color-rendering device 120. In an example, producing colors from the available inks may be performed by halftoning, by mixing the inks directly, or by any other suitable printing technique.

A substrate may include paper, textiles, plastics, or any other paper-like, flexible or rigid medium onto which inks can be deposited to render an image. Different substrates may have different properties relevant to the deposit of printing fluid, such as adherence, absorbency, glossiness. A substrate may also refer to different types of screen for a display monitor, which may have different properties such as resolution, brightness, refresh rate, reflectance.

The images 110 may take any suitable form for example a raster image file, a vector image file, a mixed vector/raster file such as the Portable Document format (PDF) files, a page description language (PDL) file or any electronic document which may include a page oriented aggregation of text, image and graphic data, and metadata that may be used for rendering this information. In a raster image file, the image may be defined by a plurality of pixels, wherein each pixel comprises a series of digital values representing a color within a given color model. When an 8-bit RGB model is used, each pixel may comprise three 8-bit values representing quantities from 0 to 255. In a vector image file, the image may be defined by a series of geometric shapes, wherein these shapes have an associated color value. For example, a square may be defined as extending from pixel co-ordinate A to pixel co-ordinate B and have an associated 8-bit RGB value. The term image is not limited to literal digital images and may include data that includes text and typography definitions, as well as other visual information to be printed and metadata useful for rendering.

The storage medium 105 may be a non-transitory computer-readable storage medium for example, a hard drive, a CD-ROM disc, a USB-drive, a solid-state drive or any other form of magnetic storage device, optical storage device, or flash memory device, maintained locally or accessed remotely, capable of having thereon computer readable code suitable for the function described herein.

The controller 125 may be a computer terminal including a user interface operable to: send images to the first printing device 120 and to receive printing parameters used to print the image; receive a code and optionally instructions from the code reading device 130; and send images with printing parameters to the second printing device 140.

The system 100 may manage a number of images 110 for one or more customers, including tracking printing parameters used to print the images, and to track use of the images. For example, the following tracking metadata may be stored and associated with a printing of an image: image ID; data and time; job number; customer number; printer model; firmware version; serial number; printer settings; substrate name and ID; substrate white colorimetric data; linearization; calibration data; ICC profile; raster image processor (RIP) model and version; RIP color settings such as input profiles and rendering intents; digital file information such as file format, revision or last modified date, size; and fonts.

The printed image 150 derived from the image 110 in the storage 105 is printed using specific printing parameters and is printed with an embedded code 155, for example a QR code. The embedded code 155 may be overlaid on the image 155 or may be printed outside the image for example in a corner. The embedded code may be visible or invisible to a viewer of the image but may be machine readable irrespective. The embedded code 155 may be a printed copy of the printing parameters whether in text or coded for example as a bar code or QR code. Alternatively, the embedded code may be an identifier for the printing parameters stored elsewhere.

Figure 2:
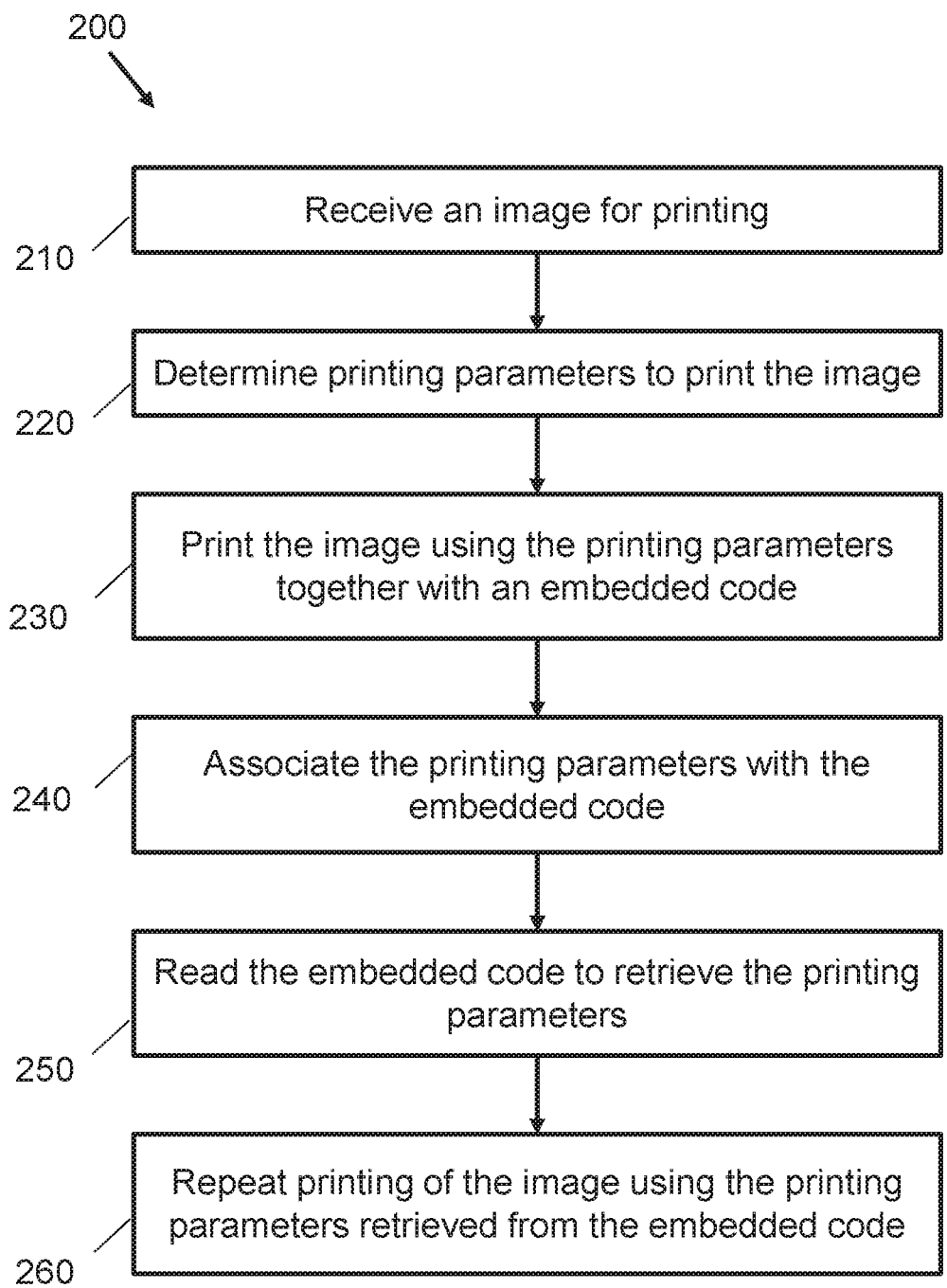
FIG. 2 is a flow chart showing a method of repeating printing of a color image according to an example.

FIG. 2 illustrates a flow diagram of an example method 200 of printing management which may be implemented using the system 100. At block 210, the method comprises receiving an image for printing. This may be implemented by the printing device 120 receiving an image 110 from the controller 125 and storage 105. This may be in response to a customer request for example, to print an image with a unique identifier. The image 110 may be received in many different formats, for example as print instructions for the printing device 120, including printer setting such as substrate, colorant selection and printing speed, or the image may be received as image data for conversion and transformation by the printing device 120, for example mapping from an input color space to a color space associated with the printing device 120.

At block 220, the method comprises determining printing parameters used to print the image. These printing parameters may include the above described metadata associated with the image (e.g. image ID, job ID) as well as printing parameters used by the printing device to print the image such as substrate and colorant selection. The printing parameters may be received from the controller 125 with the image 110, and/or they may be determined by the printing device (e.g. color mapping parameters associated with mapping the image data into the color space of the printing device).

At block 230, the method comprises printing the image using the printing parameters together with an embedded code corresponding to the printing parameters. The printing parameters may include printer settings as well as metadata for tracking the image and how it was processed prior to printing. As noted previously, the embedded code may contain the printing parameters directly or may refer to them elsewhere, for example in a database record.

At block 240, the method comprises associating the printing parameters with the embedded code. This may be implemented by logically linking the code and the printing parameters in a database, whether local to the printing device or remote. For example, the embedded code may contain an image identifier referring to a particular image which may be stored locally or remotely. When the image identifier is later read from the embedded code it may then be used to retrieve the same image from the local or remote storage. In another example, certain printing parameters used to process the image before printing, for example color mapping, may be recovered from the embedded code and used to print the image again, using the same process and/or to help analyze the printed image.

At block 250, the method comprises reading the embedded code to retrieve the printing parameters. This may be implemented using a QR or barcode scanner as appropriate, or a processor configured to recognize a watermark in a captured image. Where the embedded code comprises text or other symbols these may be recognized using optical character recognition (OCR) or other technologies. The recovered data may comprise the printing parameters or may refer to them, for example an identifier in a database which contains the code or code identifier together with the printing parameters. Block 250 may be implemented by a smartphone capturing an image of the printed image 150 together with embedded code 155 and forwarding this for scanning or recognition elsewhere, for example at the controller 125. The printing parameters may be retrieved from the database 115 which may store them in a record together with the code.

At block 260, the method comprises repeating printing of the image using the printing parameters retrieved from the embedded code. This may be implemented at the same printing device 120 or a different printing device 140. The image may be printed with or without the embedded code. The controller 125 may instruct a printing device 120, 140 to print the same image using an image identifier using the same printing parameters as the original printed image 150 by using the printing parameters recovered from the database 115 using the recovered code 155.

In an example application, a user may print an image 150 using their own printing device 120, with the embedded code recording printing parameters such as image identifier and printer settings. Another user, or the same user at a different point in spacetime, may then repeat printing of this image by scanning the original image at the printing device 120 which has an integrated code reding device 130. The image is retrieved from a local or remote database and the printing device 120 is automatically set according to the printing parameters and the image reprinted.

In another example, a print service provider (PSP) may professionally print an image for a customer using a printing press for example. The image identifier and other metadata together with the printer settings may be stored on a third-party image provider's database. The customer at a different location may then desire another copy of the printed image and contacts the image provider who instructs the customer to take a photograph of the printed image, which will include the embedded code, and send this to the image provider. The image provider reads the code in the photograph and retrieves the printing parameters for the image and sends this together with the printing parameters to another PSP local to the customer. The new PSP is then able to reprint the original image for the customer.

Figure 3:
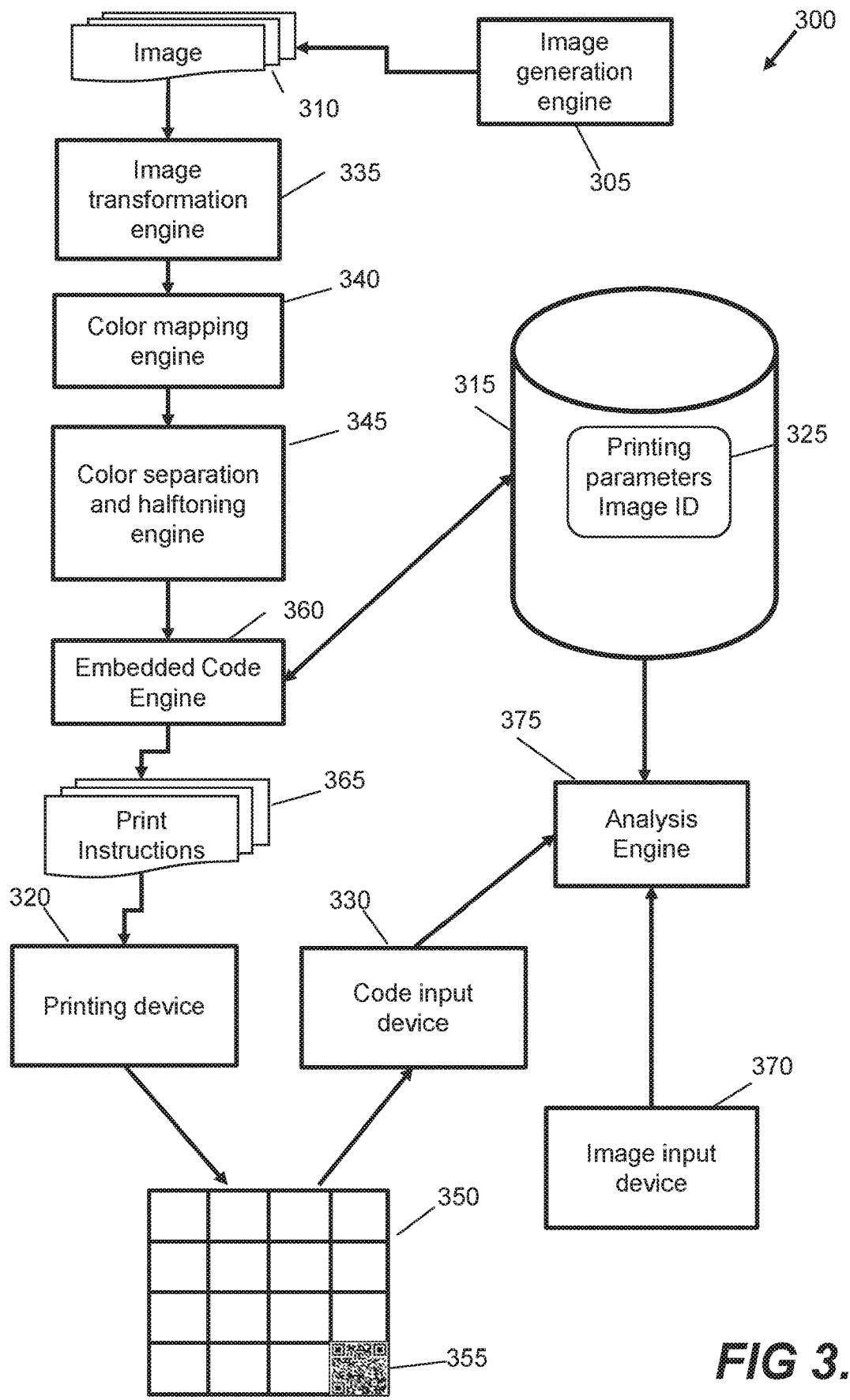
FIG. 3 is a schematic diagram of a printing management system for analysis according to another example.

FIG. 3 shows a printing management matching system according to an example. The printing management system 300 comprises a database 315 containing codes, printing parameters and signatures, an image generation engine 305, an image transformation engine 335, a color mapping engine 340, a color separation and halftoning engine 345, an embedded code engine 360, an analysis engine 375, a printing device 320, a code input device 330 and an image input device 370.

The image generation engine 305, image transformation engine 335, color mapping engine 340, color separation and halftoning engine 345, embedded code engine 360, and analysis engine 370 may be implemented as a combination of hardware, such as control circuitry, and/or programming configured to perform the functionality described herein.

One or more of these engines 305, 335, 340, 345, 360, 370 may be implemented by a processor executing computer program code stored on a storage medium.

The system 300 may receive one or more images 310 from an external source or use an image generation engine 305. The image generation engine 305 may be implemented by a computer aided drawing (CAD) software suite or may be implemented by a camera or scanner which converts a physical image into digital image data. In one example, the image generation engine builds a set of color patches to help configure the system, for example to profile and/or calibrate the printing device 320. The patches may be associated with a list of colors used to build them, for example a list of contone RGB, CYMK or NPACs and/or the generation process such as 17-cubed RGB sampling. The image may also be associated with an image identifier. This collection of printing parameters may be stored in the database 315 as a signature 325 uniquely associated with the image.

The image generation engine 305 may then use these patches to build a chart, for example a simple pattern of the different patches so that these can be analyzed later when printed. This image may be associated with information or printing parameters used in its generation, for example date, patch and chart size, image data file size and type. These printing parameters may be added to the signature 325 for the image. The image may undergo further processing as described below, and each time parameters relevant to that process may be added to the signature 325. In other examples, no further processing and the image is printed on the printing device 320. In this case some additional printing parameters may be added to the signature, for example date of printing, printer identifier, substrate used. In other examples, the printing device 320 may receive an image in the form of print instructions 365 and these may be associated with printing parameters used to generate the print instructions including for example any color mapping or halftoning parameters that may have been used. This information may be received as metadata and added to or used to generate a signature.

The image transformation 335 engine may perform image processing such as file compression or decompression, tone mapping, file type conversion or other color properties. The color mapping engine 340 may covert the image from a source color space to the color space of the printing device 320. The source color space may be source device dependent or a device independent color space. The color separation and halftoning engine 345 and may include a raster image processor (RIP) to produce bitmap image data to enable the printer to print pixels of color. The complex color of each pixel may be separated into a combination or colors that can be used to represent each color based on the colorants available to the printing device 320. This may depend on the halftoning strategy used, for example the size of ink drops used for each pixel. The resulting print instructions 365 can be used to control the printing device to render the printed image 350.

The embedded code engine 365 may add a QR code or other type of code to the print instructions 365 such that an embedded code 355 is printed with the printed image 355. In one example, this may be a QR code printed on one square of a chart image 350 having a number of differently colored squares corresponding to the previously described patches. In another example, a more complex image may be printed such as a landscape or profile together with an embedded code which overlays the image—in other words part of the image and the embedded code are combined or printed at the same locations. The embedded code may be visible such as a barcode, or it may not be visible to a human viewer of the image, for example an invisible watermark that is only machine readable.

The embedded code 355 may comprise some or all of the printing parameters contained in the signature 325 for the image. The embedded code may additionally or alternatively comprise an identifier or location for the signature in the database 315, or an external data store containing the or a copy of the signature. The printing parameters are associated with the embedded code such that the printing parameters may be retrieved from the printed image 350 using the embedded code—either directly within the embedded code 355 or using a signature identifier or location within the embedded code. This association makes it easier to relate or link the printing parameters to the printed image 350 so that they are not lost or forgotten for example, as may occur when this process is attempted manually. The association between printing parameters and embedded code also makes it much easier to trace the processing involved in the printing of the image, including all the way back to its generation and any transformations and color processing it may have undergone.

The printing device 320 may render a printed image 350 using the printing parameters as previously described, including printing an embedded code 355 with the image. The database 315, printing device 320, code input device 330 and images may be as described with respect to the corresponding components of the example of FIG. 1. The codes and printing parameters stored in the database 315 may be the same or similar to those described with respect to FIG. 1, although other examples are possible.

The code input device 330 may be a barcode scanner that is able to recover data from the embedded code, such as the printing parameters and/or a signature identifier or location so that the printing parameters may be retrieved. The code input device 330 may be integrated with the printing device 320 although it may be a separate QR scanner for example. The image input device 370 may be a color measuring device such as a tristimulus colorimeter or a spectroradiometer for example.

The analysis engine 375 may be used to analyze the image using the readings from the image input device 370 and the printing parameters retrieved using the embedded code read by the code input device 330. The results from the analysis engine 375 may be added to the signature 325 associated with the image.

Figure 4:
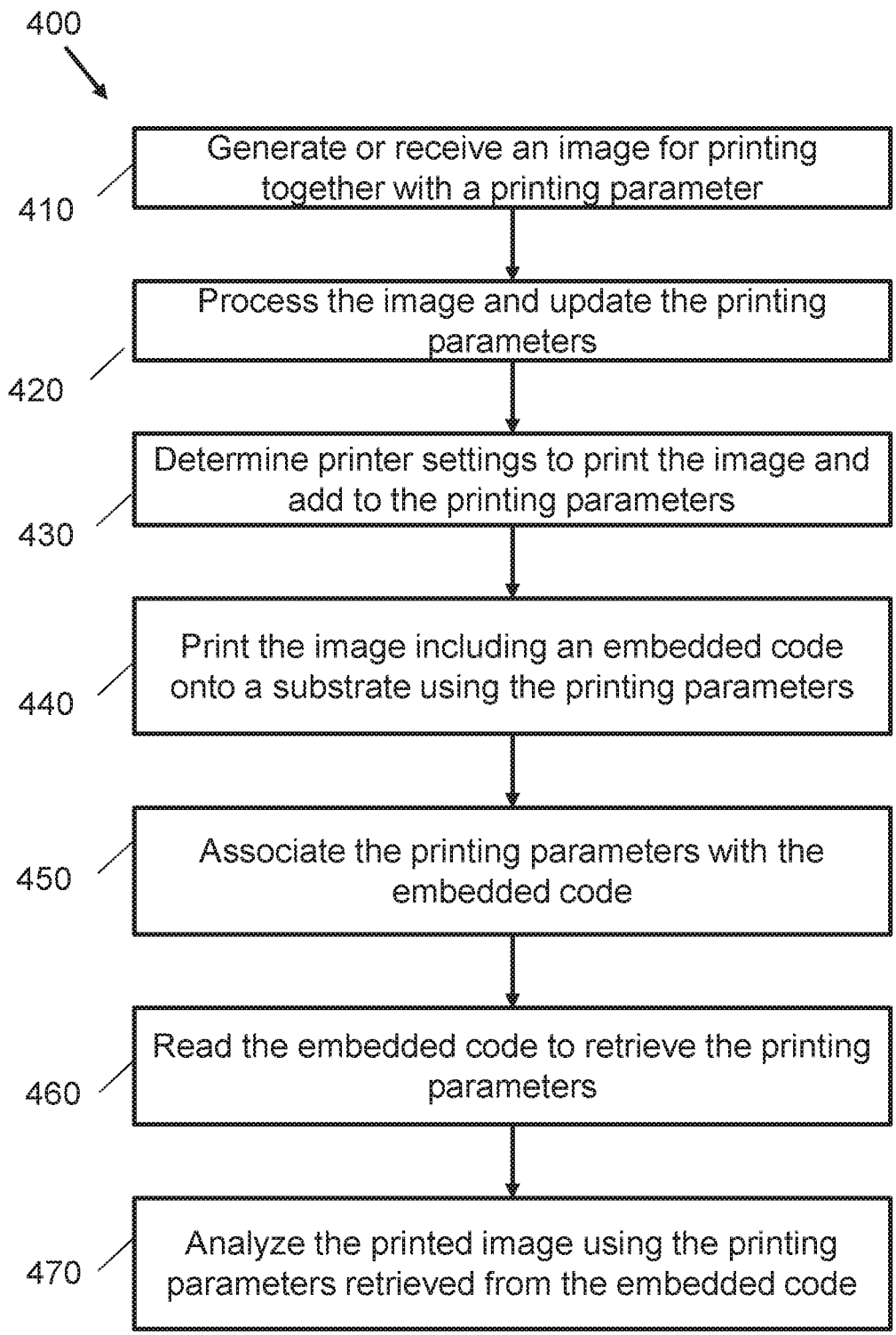
FIG. 4 is a flow chart showing a method of analyzing a printed color image according to an embodiment.

FIG. 4 illustrates a flow diagram of an example method 400 of printing management which may be implemented using the system 300. At block 410, the method comprises generating or receiving an image for printing together with one or more printing parameters. As noted above, the printing parameters may include an image identifier and information relating to colors used to generate the image, any color space mappings undergone, data transformations and other related information which may be received and/or stored as a signature for the image. The signature may be stored locally or at a remote data storage device. At block 420, the method comprises further processing the image, for example color mapping into the color space of the printing device, color separating and halftoning. The parameters used are added to the signature.

At block 430, the method comprises determining printer settings used to print the image and adding these to the signature as additional printing parameters. These settings may include the print date, the printer identifier, the substrate used, the colorants used, the printing speed, and calibration status. At block 440, the method comprises printing the image onto a substrate using at least some of the printing parameters such as the substrate selection and printing speed. An embedded code is printed with the image and which corresponds with the printing parameters. As noted above, the embedded code may contain some or all of the printing parameters or it may refer to them, for example as a record number in a database. The embedded code may be any suitable human visible or invisible code such as a QR code.

At block 450, the method comprises associating the printing parameters with the embedded code. This may be implemented by logically linking the code and the printing parameters in a database, whether local to the printing device or remote. For example, the embedded code may contain an image identifier referring to a particular image which may be stored locally or remotely. When the image identifier is later read from the embedded code it may then be used to retrieve other printing parameters such as print speed and colorants used. In another example, certain printing parameters used to process the image before printing, for example color mapping, may be recovered from the embedded code and used to help analyze the printed image.

At block 460, the method comprises reading the embedded code to retrieve the printing parameters. This may be implemented using a QR or barcode scanner as appropriate, or a processor configured to recognize a watermark in a captured image. Where the embedded code comprises text or other symbols these may be recognized using optical character recognition (OCR) or other technologies. The recovered data may comprise the printing parameters or may refer to them, for example an identifier in a database which contains the printing parameters. Block 250 may also be implemented by a camera or smartphone capturing an image of the printed image 350 together with embedded code 355 and forwarding this for scanning or recognition elsewhere. The printing parameters may then be retrieved from the database 315 which may store them in a record together with an identifier within the embedded code.

At block 470, the method comprises analyzing the printed image using the printing parameters retrieved from the embedded code. This may be implemented using a colorimetry measuring device to measure one of the printed patches (squares of image 350) and using the output signal together with the printing parameters to determine the accuracy of the color reproduction of the printing device.

Figure 5:
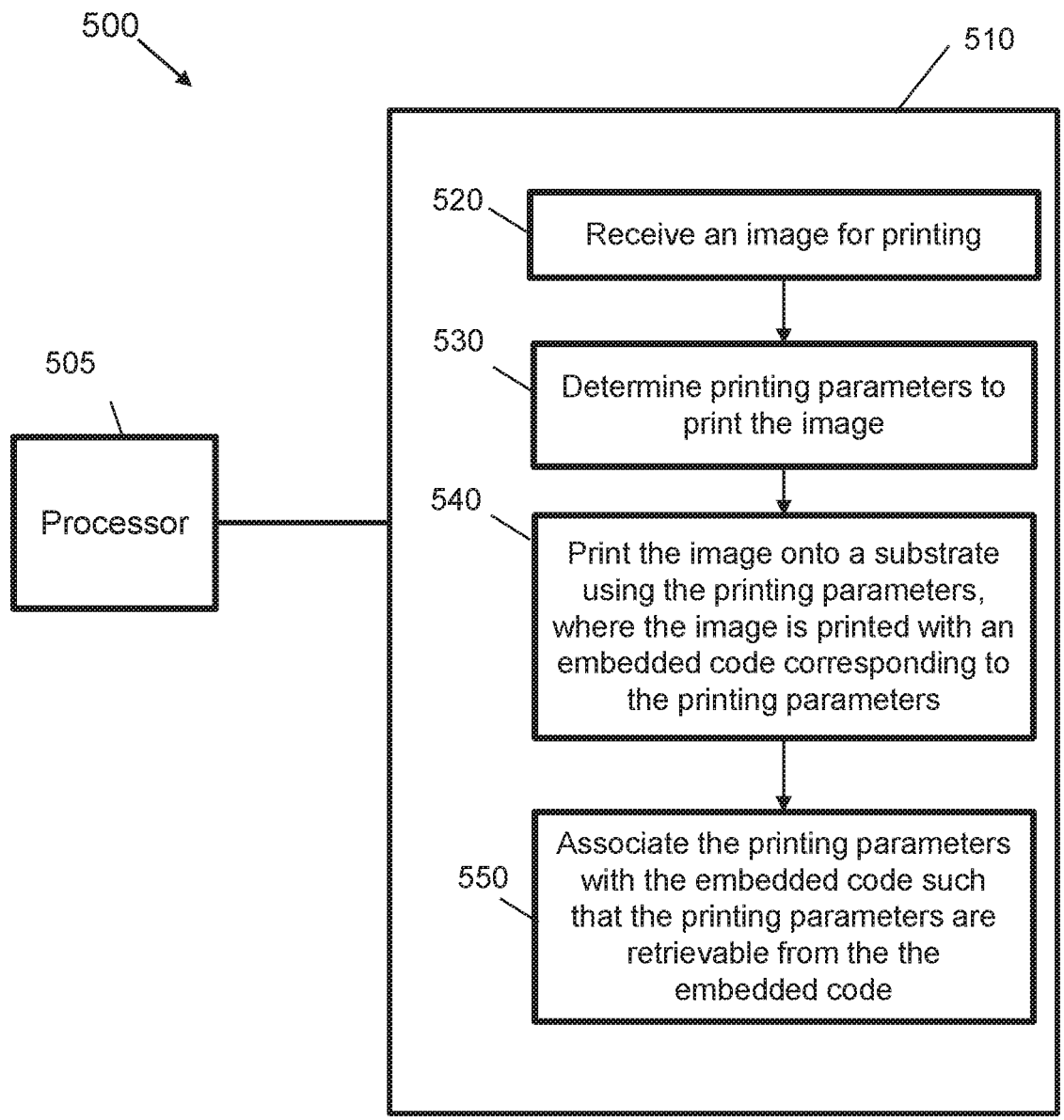
FIG. 5 is a schematic diagram of a non-transitory computer-readable storage medium according to an example.

FIG. 5 shows a schematic diagram of an example non-transitory computer-readable storage medium 510 storing instructions that, when executed by a processor 505, cause the processor 505 to perform the operations described below. A first set of instructions 520 may cause the processor 505 to receive an image for printing. This may be received from an external source or generated using a CAD system for example.

A second set of instructions 530 may cause the processor 505 to determine printing parameters to print the image. The printing parameters may include an image identifier as well as printer settings used to print the image and/or color processing parameters used to process the image data such as color mappings. A third set of instructions 540 may cause the processor 505 to printing the image onto a substrate using the printing parameters, where the image is printed with an embedded code corresponding to the printing parameters. The code may be a QR code for example and may include the or some printing parameters and/or may refer to the printing parameters. The printing parameters may include an image identifier.

A fourth set of instructions 550 may cause the processor 505 to associate the printing parameters with the embedded code such that the printing parameters are retrievable from the printed image using the embedded code. This may include storing the printing parameters in a data storage device at a location identified by the embedded code or it may include storing an image identifier in the embedded code, in both cases so that some or all of the printing parameters may be retrieved from the data storage device whether located locally or remotely.

Certain examples described herein allow for a user of a guided color matching system to select or confirm a target color-rendering device to replicate the rendering of a color image by a reference color-rendering device. Color reproduction parameters of the respective devices may be used together with color matching parameters to provide an objective mechanism for selecting and/or to provide an indication of the likelihood of a good color match between selected pairs of reference and target color-rendering devices. This may allow a user to more confidently assign print jobs to available printers, to assist with device upgrade pathways, and to assess how best to change substrate and other color resources such as ink supplier.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method comprising:
receiving an image for printing;
determining printing parameters to print the image;
printing the image onto a substrate using the printing parameters, wherein the image is printed with an embedded code corresponding to the printing parameters; and
associating the printing parameters with the embedded code containing an image identifier referring to a particular image, including storing the embedded code and the printing parameters including the image identifier in a data storage device, such that the printing parameters are retrievable from the data storage device using the embedded code to retrieve and print the same image, wherein the printing parameters include parameters to be used by a print rendering device and parameters used to transform the image in earlier processing, and wherein the printing parameters are used to replicate a same image rendered by a different print rendering device or a same print rendering device at a different time by linking an originally printed image with the printing parameters used to print the image.

2. The method of claim 1, wherein image metadata is included in the printing parameters.

3. The method of claim 2, wherein the image metadata includes one or more of the following: an image identifier; a customer identifier; a job identifier; a date of printing.

4. The method of claim 1, wherein associating the printing parameters with the embedded code comprises sending the embedded code and printing parameters to a remote location.

5. The method of claim 1, wherein the printing parameters include one or more of: substrate; colorant set; print speed; color gamut of printer; color processing parameters; half-toning parameters; image transformation parameters.

6. The method of claim 1, wherein the embedded code includes one or more of: a QR code; a bar code; text; a watermark.

7. The method of claim 1, wherein the printing parameters are retrieved by reading the embedded code to repeat the printing of the image.

8. The method of claim 1, comprising:
receiving image data for the image;
processing the image data according to a number of workflow processes in order to generate processed image data for printing the image;
generating an image signature associated with one or more workflow parameters used in each workflow process;
wherein the signature is included in the printing parameters.

9. The method of claim 8, wherein the workflow parameters are retrieved by reading the embedded code to analyze the printed image.

10. The method of claim 8, wherein the workflow parameters comprise one or more of the following: color processing parameters; half-toning parameters; image transformation parameters; color profiles; image metadata.

11. A system comprising:
a printing device to apply print material to a substrate in a printing process;
a processor to control the printing device to print an image onto the substrate according to image data for the image and one or more printing parameters, wherein the image is to be printed with an embedded code corresponding to the printing parameters such that the printing parameters are retrievable using the embedded code, and to associate the printing parameters with the embedded code containing an image identifier referring to a particular image such that the printing parameters including the image identifier are retrievable from the embedded code to retrieve and print the image, wherein the printing parameters include parameters to be used by a print rendering device and parameters used to transform the image in earlier processing, and wherein the printing parameters are to be used to replicate a same image rendered by a different print rendering device or a same print rendering device at a different time by linking an originally printed image with the printing parameters used to print the image; and
a data storage device to store the image data and the associated printing parameters and embedded code.

12. The system of claim 11, comprising a code input device to obtain the embedded code from the substrate and a processor to retrieve the set of printing parameters using the embedded code to print a further copy of the image onto a substrate using the retrieved printing parameters.

13. The system of claim 12, comprising a code input device to obtain the embedded code from the substrate and a processor to retrieve the set of printing parameters using the embedded code to analyze the printed image.

14. A non-transitory computer-readable storage medium storing instructions that, when executed by a processor, cause the processor to:
receive an embedded code containing an image identifier referring to a particular image that is read from a first substrate having a printed image;
query a data storage device to retrieve printing parameters including the image identifier associated with the embedded code to retrieve and print the same image, wherein the printing parameters include parameters to be used by a print rendering device and parameters used to transform the image in earlier processing, and wherein the printing parameters are to be used to replicate a same image rendered by a different print rendering device or a same print rendering device at a different time by linking an originally printed image with the printing parameters used to print the image;
receive image data for printing an image; and
send instructions to control a printing device to print the image onto a second substrate using the image data and the retrieved printing parameters.

* * * * *